(12) United States Patent
Katagiri (10) Patent No.: US 11,560,671 B2
(45) Date of Patent: Jan. 24, 2023

(54) RUBBER-REINFORCING CORD AND RUBBER PRODUCT INCLUDING SAME

(71) Applicant: Nippon Sheet Glass Company, Limited, Tokyo (JP)

(72) Inventor: Shinya Katagiri, Aichi (JP)

(73) Assignee: Nippon Sheet Glass Company, Limited, Tokyo (JP)

(*) Notice: Subject to any disclaimer, the term of this patent is extended or adjusted under 35 U.S.C. 154(b) by 589 days.

(21) Appl. No.: 16/619,755

(22) PCT Filed: Jun. 8, 2018

(86) PCT No.: PCT/JP2018/022051
§ 371 (c)(1),
(2) Date: Dec. 5, 2019

(87) PCT Pub. No.: WO2018/235636
PCT Pub. Date: Dec. 27, 2018

(65) Prior Publication Data
US 2020/0208344 A1   Jul. 2, 2020

(30) Foreign Application Priority Data

Jun. 19, 2017   (JP) .............................. JP2017-119707

(51) Int. Cl.
*D07B 1/16* (2006.01)
*C08L 9/02* (2006.01)
(Continued)

(52) U.S. Cl.
CPC ................ *D07B 1/162* (2013.01); *C08L 9/02* (2013.01); *C09D 109/02* (2013.01); *F16G 1/08* (2013.01);
(Continued)

(58) Field of Classification Search
CPC ............ D07B 1/162; D07B 2201/2087; D07B 2201/2092; D07B 2205/2082;
(Continued)

(56) References Cited

U.S. PATENT DOCUMENTS 6,664,325 B1   12/2003   Nakamura
10,913,830 B2 *   2/2021   Katagiri .............. D06M 13/352
(Continued)

FOREIGN PATENT DOCUMENTS

EP   2014824   1/2009
JP   2000212878   8/2000
(Continued)

OTHER PUBLICATIONS

Extended European Search Report issued for European Patent Application No. 18820030.7, dated Mar. 30, 2021, 5 pages.
(Continued)

*Primary Examiner* — Shaun R Hurley
(74) *Attorney, Agent, or Firm* — Hamre, Schumann, Mueller & Larson, P.C.

(57) ABSTRACT

A rubber-reinforcing cord (12) of the present invention includes at least one strand. The strand includes at least one filament bundle and a coating provided to cover at least a portion of a surface of the filament bundle. The coating includes a rubber component including at least one selected from the group consisting of carboxyl-modified nitrile rubber and carboxyl-modified hydrogenated nitrile rubber, an isocyanate compound, a bismaleimide compound, carbon black, and a rubber-modified epoxy resin. In the coating, the content of the isocyanate compound is 10 to 50 parts by mass, the content of the bismaleimide compound is 5 to 25 parts by mass, the content of the carbon black is 2 to 18 parts
(Continued)

by mass, and the content of the rubber-modified epoxy resin is 5 to 30 parts by mass, with respect to 100 parts by mass of the rubber component.

8 Claims, 2 Drawing Sheets

(51) Int. Cl.
    *C09D 109/02*     (2006.01)
    *F16G 1/08*     (2006.01)
    *F16G 1/10*     (2006.01)
    *F16G 1/28*     (2006.01)

(52) U.S. Cl.
    CPC ........ *F16G 1/10* (2013.01); *D07B 2201/2087* (2013.01); *D07B 2201/2092* (2013.01); *D07B 2205/2082* (2013.01); *D07B 2205/3003* (2013.01); *D07B 2501/2076* (2013.01); *F16G 1/28* (2013.01)

(58) Field of Classification Search
    CPC .... D07B 2205/3003; D07B 2501/2076; C08L 9/02; C09D 109/02; F16G 1/08; F16G 1/10; B29D 29/08; C03C 25/10; C03C 25/25; C03C 25/26; C03C 25/27; C03C 25/36; D06M 11/74; D06M 13/395; D06M 13/418; D06M 15/55

See application file for complete search history.

(56) References Cited

U.S. PATENT DOCUMENTS

| | | | | |
|---|---|---|---|---|
| 2010/0267863 | A1* | 10/2010 | Furusawa | F16G 1/08 |
| | | | | 428/394 |
| 2013/0199832 | A1* | 8/2013 | Galster | H05K 3/00 |
| | | | | 156/60 |
| 2014/0093729 | A1* | 4/2014 | Furusawa | D06M 15/693 |
| | | | | 523/205 |
| 2016/0377149 | A1 | 12/2016 | Furusawa | |
| 2018/0347109 | A1* | 12/2018 | Katagiri | D07B 1/162 |
| 2018/0355129 | A1 | 12/2018 | Katagiri | |

FOREIGN PATENT DOCUMENTS

| | | |
|---|---|---|
| JP | 3759857 | 3/2006 |
| JP | 2016145440 | 8/2016 |
| WO | 2007129624 | 11/2007 |
| WO | 2017010098 | 1/2017 |

OTHER PUBLICATIONS

International Search Report and Written Opinion issued for International Patent Application No. PCT/JP2018/022051, dated Aug. 21, 2018, 8 pages including English translation of Search Report.

\* cited by examiner

RUBBER-REINFORCING CORD AND RUBBER PRODUCT INCLUDING SAME

TECHNICAL FIELD

The present invention relates to a rubber-reinforcing cord and a rubber product including the rubber-reinforcing cord.

BACKGROUND ART

A rubber belt or metal chain is used for driving a cam shaft of an internal combustion engine for an automobile, driving an accessory such as an injection pump, and transmitting power in an industrial machine. There has been an increasing interest in energy saving recently, and attention is focused on the use of rubber belts which have high power transmission efficiency, for example, in view of improvement of fuel efficiency and the like. Having higher strength and higher elastic modulus than metal chains, rubber belts also have an advantage of capable of being used even under a high load condition. However, the strength of rubber belts may be decreased by repeated application of stress, and thus rubber belts are limited in use.

A rubber product such as a rubber belt commonly includes matrix rubber and a rubber-reinforcing cord embedded in the matrix rubber. The strength of the rubber belt depends on the strength of the rubber-reinforcing cord. The rubber-reinforcing cord is, therefore, an important member that determines the durable life of the rubber belt.

The rubber-reinforcing cord is commonly formed of reinforcing fibers (a filament bundle including a plurality of filaments) and a coating protecting the surface of the reinforcing fibers. Such a coating can improve the adhesion between the rubber-reinforcing cord and matrix rubber when the rubber-reinforcing cord is embedded in the matrix rubber of a rubber product.

It is conventionally known (see Patent Literature 1, for example) that when matrix rubber is hydrogenated nitrile rubber, a rubber-reinforcing cord including a first coating layer which is a primary coating layer and a second coating layer which is an overcoat layer having contact with the matrix rubber is used in a rubber product including such matrix rubber and a coating including chlorosulfonated polyethylene is used as the second coating layer.

CITATION LIST

Patent Literature

Patent Literature 1: WO 2007/129624 A1

SUMMARY OF INVENTION

Technical Problem

However, the above conventional rubber-reinforcing cord and rubber product have the following problems.

In rubber products, particularly toothed belts for automobiles, hydrogenated nitrile rubber is predominantly used as matrix rubber. In the case of rubber-reinforcing cords used in rubber products including such matrix rubber, a conventional first coating, for example, formed from a liquid mixture (RFL) of a resorcinol-formaldehyde condensate and rubber latex cannot achieve sufficient adhesion to the hydrogenated nitrile rubber by itself. Therefore, a second coating including chlorosulfonated polyethylene as a main material is indispensable for rubber-reinforcing cords. That is, a two- or more-layer coating needs to be provided. Incidentally, when a large amount of a crosslinking agent is added to impart high adhesion to a conventional first coating, the first coating sometimes can achieve the adhesion to hydrogenated nitrile rubber as matrix rubber by itself. However, the large amount of the crosslinking component causes a new problem in that the coating is so hard that the bending fatigue resistance is decreased.

When the material used in a conventional second coating is used in a first coating, a rubber product reinforced by the resultant rubber-reinforcing cord unfortunately has poor bending properties. The reason of this is that, although solving the adhesion problem, the coating including chlorosulfonated polyethylene as its main material is weak against repeated bending because of a high degree of hardness and being rigid.

Therefore, an object of the present invention is to provide a rubber-reinforcing cord having strong adhesion to matrix rubber, particularly matrix rubber including hydrogenated nitrile rubber, of rubber products and being capable of achieving higher bending performance, without being provided with a plurality of coatings. Another object of the present invention is to provide a rubber product reinforced by such a rubber-reinforcing cord and thus having high bending performance.

Solution to Problem

The present invention is a rubber-reinforcing cord for reinforcing a rubber product, the rubber-reinforcing cord including: at least one strand, wherein the strand includes at least one filament bundle and a coating provided to cover at least a portion of a surface of the filament bundle, the coating includes a rubber component including at least one selected from the group consisting of carboxyl-modified nitrile rubber and carboxyl-modified hydrogenated nitrile rubber, an isocyanate compound, a bismaleimide compound, carbon black, and a rubber-modified epoxy resin, and in the coating, the content of the isocyanate compound is 10 to 50 parts by mass, the content of the bismaleimide compound is 5 to 25 parts by mass, the content of the carbon black is 2 to 18 parts by mass, and the content of the rubber-modified epoxy resin is 5 to 30 parts by mass, with respect to 100 parts by mass of the rubber component.

The present invention also provides a rubber product reinforced by the above rubber-reinforcing cord according to the present invention.

Advantageous Effects of Invention

The rubber-reinforcing cord of the present invention has strong adhesion to matrix rubber, particularly matrix rubber including hydrogenated nitrile rubber, of rubber products and can achieve higher bending performance, without being provided with a plurality of coatings. Moreover, the rubber product of the present invention is reinforced by such a rubber-reinforcing cord and thus has high bending performance.

DESCRIPTION OF EMBODIMENTS

Hereinafter, embodiments of the present invention will be described.

[Rubber-Reinforcing Cord]

A rubber-reinforcing cord according to the present embodiment is a cord for reinforcing rubber products. The rubber-reinforcing cord includes at least one strand. The strand includes at least one filament bundle (reinforcing fibers) and a coating provided to cover at least a portion of a surface of the filament bundle. The coating includes a rubber component at least one selected from the group consisting of carboxyl-modified nitrile rubber and carboxyl-modified hydrogenated nitrile rubber, an isocyanate compound, a bismaleimide compound, carbon black, and a rubber-modified epoxy resin.

Hereinafter, a method for producing the reinforcing cord of the present embodiment will be described in detail.

In the rubber-reinforcing cord of the present embodiment, the filament bundle composing the strand includes a plurality of filaments. The material of the filaments is not particularly limited. As the filaments of the rubber-reinforcing cord of the present embodiment, for example, glass fiber filaments, polyvinyl alcohol fiber filaments typified by vinylon fibers, polyester fiber filaments, polyamide fiber filaments such as nylon and aramid (aromatic polyamide) fibers, carbon fiber filaments, and poly(p-phenylene benzobisoxazole) (PBO) fiber filaments can be used. Among these, filaments of fibers having excellent dimensional stability, tensile strength, modulus, and bending fatigue resistance are preferably used. It is preferable to use at least one type of fiber filaments selected from, for example, glass fiber filaments, aramid fiber filaments, poly(p-phenylene benzobisoxazole) fiber filaments, and carbon fiber filaments. In particular, glass fiber filaments are preferred. The filament bundle may be composed of one type of the filaments, or may be composed of two or more types of the filaments.

The number of filaments included in the filament bundle is not particularly limited. The filament bundle can include, for example, 200 to 24,000 filaments.

The surface of the filaments included in the filament bundle may be subjected to a pretreatment for increasing the adhesion strength. A preferred example of a pretreatment agent is a compound containing at least one functional group selected from the group consisting of an epoxy group and amino group. Examples of the pretreatment agent include aminosilanes, epoxysilanes, novolac epoxy resins, bisphenol A epoxy resins, bisphenol F epoxy resins, brominated epoxy resins, bisphenol AD epoxy resins, and glycidyl amine epoxy resins. Specific examples include Denacol series available from Nagase ChemteX Corporation, EPICLON series available from DIC Corporation, and Epikote series available from Mitsubishi Chemical Corporation. Polyurethane resins and isocyanate compounds can also be used as the pretreatment agent. For example, a treatment agent including at least one selected from the group consisting of epoxy resins, urethane resins, and isocyanate compounds may be used as the pretreatment agent. By the pretreatment performed using such a treatment agent, a resin layer including at least one selected from the group consisting of epoxy resins, urethane resins, and isocyanate compounds is further provided between the filament bundle and coating. The pretreatment of the surface can enhance the adhesion between matrix rubber and the rubber-reinforcing cord also when less-adhesive fiber filaments, such as polyparaphenylene terephthalamide fiber filaments, are used. It should be noted that the coating (pretreatment agent film) formed on the surface of the filaments by the pretreatment of the filaments and made of the pretreatment agent is different from the coating of the present embodiment covering at least a portion of the surface of the filament bundle, and is not included in the coating of the present embodiment.

The number of filament bundles included in the rubber-reinforcing cord is not particularly limited, and may be one or may be two or more. The filament bundle may include a plurality of filament bundles assembled together. In this case, each of the plurality of filament bundles may be twisted or untwisted. The plurality of filament bundles in one bundle may be twisted together or may be untwisted.

The coating is provided to cover at least a portion of the surface of the filament bundle. The coating may be provided directly on the surface of the filament bundle, or may cover the surface of the filament bundle with another layer interposed therebetween. The rubber-reinforcing cord of the present embodiment may not be provided with other coating than this coating. As described above, the term "other coating" as used herein does not include the above pretreatment agent film. Therefore, the rubber-reinforcing cord in which this coating is provided on the surface of the filament bundle including the filaments provided with the pretreatment agent film can be a "rubber-reinforcing cord not provided with other coating than this coating."

The coating is formed by providing the later-described water-based treatment agent for coating formation on at least a portion of the surface of the filament bundle and drying the provided water-based treatment agent for coating formation by heat treatment. The water-based treatment agent can be provided on the surface of the filament bundle, for example, by impregnating the filament bundle with the water-based treatment agent for coating formation, or by applying the water-based treatment agent for coating formation to at least a portion of the surface of the filament bundle. This heat treatment almost completely removes water included in the filaments themselves and a solvent (e.g., water) of the water-based treatment agent.

The coating includes a rubber component. The rubber component includes at least one selected from the group consisting of carboxyl-modified nitrile rubber (X-NBR) and carboxyl-modified hydrogenated nitrile rubber (X-HNBR). The total amount of the carboxyl-modified nitrile rubber and carboxyl-modified hydrogenated nitrile rubber included in the rubber component is preferably 70 mass % or more and more preferably 90 mass % or more. The rubber component may consist of the carboxyl-modified nitrile rubber and/or carboxyl-modified hydrogenated nitrile rubber. That is, the total amount of the carboxyl-modified nitrile rubber and carboxyl-modified hydrogenated nitrile rubber in the rubber component may be 100 mass %. The coating may further include rubber other than the carboxyl-modified nitrile rubber and carboxyl-modified hydrogenated nitrile rubber. Examples of the rubber other than the carboxyl-modified nitrile rubber and carboxyl-modified hydrogenated nitrile rubber include a butadiene-styrene copolymer, dicarboxylated butadiene-styrene polymer, vinylpyridine-butadiene-styrene terpolymer, chloroprene, butadiene rubber, chlorosulfonated polyethylene, an acrylonitrile-butadiene copolymer, nitrile rubber (NBR), and hydrogenated nitrile rubber (HNBR).

The coating further includes an isocyanate compound. The content of the isocyanate compound in the coating is 10 to 50 parts by mass, desirably 20 to 40 parts by mass, and more desirably 25 to 35 parts by mass with respect to 100 parts by mass of the rubber component. Examples of the isocyanate compound include aromatic or aliphatic organic diisocyanates, polyisocyanates, blocked isocyanates, and blocked polyisocyanates.

The coating further includes a bismaleimide compound. The content of the bismaleimide compound in the coating is 5 to 25 parts by mass, desirably 10 to 20 parts by mass, and more desirably 12 to 18 parts by mass with respect to 100 parts by mass of the rubber component. Examples of the bismaleimide compound include bismaleimide, phenylmaleimide, and N,N'-m-phenylenedimaleimide.

The coating further includes carbon black. The content of the carbon black in the coating is 2 to 18 parts by mass, desirably 5 to 15 parts by mass, and more desirably 7 to 13 parts by mass with respect to 100 parts by mass of the rubber component.

The coating further includes a rubber-modified epoxy resin. The content of the rubber-modified epoxy resin in the coating is 5 to 30 parts by mass, desirably 10 to 25 parts by mass, and more desirably 12 to 20 parts by mass with respect to 100 parts by mass of the rubber component. Examples of the rubber-modified epoxy resin include nitrile rubber (NBR)-modified epoxy resins and butadiene rubber-modified epoxy resins. Among these, NBR-modified epoxy resins are preferred.

When the coating includes the rubber component including at least one selected from the group consisting of carboxyl-modified nitrile rubber and carboxyl-modified hydrogenated nitrile rubber, isocyanate compound, bismaleimide compound, carbon black, and rubber-modified epoxy resin whose contents are in the above ranges, the coating can achieve fiber protection performance, high adhesion performance, and high bending fatigue resistance by itself. In particular, when the reinforcing cord of the present embodiment is included in a rubber product whose matrix rubber includes hydrogenated nitrile rubber, strong adhesion between the coating and matrix rubber can be achieved. It is thought that the strong adhesion between the coating and matrix rubber can be achieved because the rubber-modified epoxy resin included in the coating of the present embodiment, nitrile rubber which is the rubber component included in the coating, and nitrile rubber included in the matrix rubber of the rubber product side are compatible. Moreover, a network structure is formed by a reaction of the epoxy resin with a carboxyl group in the rubber component included in the coating and, in the case where the hydrogenated nitrile rubber included in the matrix rubber of the rubber product side is, for example, carboxyl-modified hydrogenated nitrile rubber, a carboxyl group included in the carboxyl-modified hydrogenated nitrile rubber. This is thought to be another reason of the improvement in the adhesion between the coating and matrix rubber. Additionally, with the use of an NBR-modified epoxy resin as the rubber-modified epoxy resin, the coating with improved flexibility can be obtained and the bending fatigue resistance of the reinforcing cord can further be improved. The rubber-modified epoxy resin reacts with the isocyanate compound and contributes to a stronger bond between the coatings. Moreover, the rubber-modified epoxy resin can promote a polymerization reaction of the bismaleimide compound to make the above network structure formed in the coating denser. As described above, the coating strength and adhesion can be improved by using the rubber-modified epoxy resin in combination with the isocyanate compound and bismaleimide compound.

The total content of the isocyanate compound, the bismaleimide compound, the carbon black, and the rubber-modified epoxy resin is desirably 100 parts by mass or less with respect to 100 parts by mass of the rubber component. If the total content of the isocyanate compound, bismaleimide compound, carbon black, and rubber-modified epoxy resin exceeds 100 parts by mass, formation of the coating can be difficult in some cases and protection of the cord and improvement in bending fatigue resistance can be prevented.

The coating is preferably free of a resorcinol-formaldehyde condensate. When the coating is free of a resorcinol-formaldehyde condensate, the formation of the coating has no need to use a substance such as formaldehyde or ammonia which may impose a heavy load on the environment, and thus requires no environmental measures to be taken for workers.

The coating may further include another component in addition to the above components.

The total content of the rubber component, isocyanate compound, bismaleimide compound, carbon black, and rubber-modified epoxy resin (which may hereinafter be simply referred to as "five components") in the coating is not limited to a particular value. The total content of the above five components in the coating is desirably 70 mass % or more and more desirably 90 mass % or more. The coating may consist essentially of the above five components. "Consisting essentially of the above five components" means that the total content of the above five components in the coating is 97 mass % or more. The coating may consist of the above five components.

The mass of the coating provided at least on the surface of the filament bundle is not particularly limited and may be adjusted as appropriate. For example, the coating is provided so that the content thereof is desirably in the range of 5 to 30 mass %, more desirably in the range of 10 to 25 mass %, and particularly desirably in the range of 13 to 19 mass % with respect to the whole reinforcing cord. Too large a mass % of the coating may result in defects such as a reduction in the dimensional stability of the rubber-reinforcing cord in a rubber product and a reduction in the elastic modulus of the rubber-reinforcing cord. Too small a mass of the coating, on the other hand, may make fraying of the strand more likely or cause a decline in the ability of the coating to protect the fibers, thus resulting in shortening of the durable life of a rubber product.

The number of twists in the rubber-reinforcing cord of the present embodiment is not particularly limited. The number of twists given to one strand (the twists may hereinafter be referred to as "primary twists") may be, for example, 1 to 6 twists/25 mm. The number of twists given to the plurality of strands (the twists may hereinafter be referred to as "final twists") may be, for example, 1 to 8 twists/25 mm. Lang lay may be employed in which the direction of the primary twists and the direction of the final twists are the same, or regular lay may be employed in which the direction of the primary twists and the direction of the final twists are opposite. The directions of the twists are not limited and may be the S direction or the Z direction.

[Method for Producing Rubber-Reinforcing Cord]

Hereinafter, an example of the method for producing the rubber-reinforcing cord of the present embodiment will be described. The features described for the rubber-reinforcing cord of the present embodiment can be applied to the following production method and may not be described repeatedly. The features described for the following production method can be applied to the rubber-reinforcing cord of the present embodiment. The example of the production method includes the following steps.

First, a plurality of filaments are assembled into a filament bundle, and a water-based treatment agent for coating formation to be used to form a coating is prepared. Next, the water-based treatment agent for coating formation is provided on at least a portion of the surface of the filament bundle. After that, a heat treatment is performed to remove the solvent in the water-based treatment agent for coating formation.

By the above steps, a coating is formed on at least a portion of the surface of the filament bundle. The method for providing the water-based treatment agent for coating formation on at least a portion of the surface of the filament bundle is not limited. For example, the water-based treatment agent for coating formation may be applied onto the surface of the filament bundle, or the filament bundle may be immersed in the water-based treatment agent for coating formation.

The conditions of the heat treatment for removing the solvent of the water-based treatment agent for coating formation are not particularly limited; however, it is necessary to avoid carrying out the drying under conditions where a reaction caused by a crosslinking agent in the coating can proceed to completion. It is therefore preferable to shorten the drying time (to 5 minutes or less, for example) when the drying is performed at a relatively high temperature (at 80° C. or above, for example). When, for example, the temperature of the atmosphere is 150° C. or below, the drying time may be 5 minutes or less. In an example, the drying may be performed in an atmosphere at 80° C. to 280° C. for 0.1 to 2 minutes.

The filament bundle on which the coating has been formed may be twisted in one direction. The direction of twisting may be the S direction or the Z direction. The number of filaments included in the filament bundle and the number of twists given to the filament bundle are as specified above and thus will not be repeatedly described. The rubber-reinforcing cord of the present embodiment can be produced in this manner. The plurality of filament bundles each having a coating may be formed, assembled together, and given final twists. The direction of the final twists may be the same as or different from the direction of the twists of each filament bundle (the direction of the primary twists). Alternatively, the plurality of filament bundles each having a coating may be formed without twisting each filament bundle, assembled together, and given twists.

The coating may be formed after the filament bundle is twisted. The type of the filaments, the number of filaments, and the number of twists of the filaments are as described above.

In a preferred example of the production method of the present embodiment, the rubber-reinforcing cord is formed by twisting a bundle of the filament bundles in one direction after application of the water-based treatment agent for coating formation to the filament bundles or impregnation of the filament bundles with the water-based treatment agent for coating formation.

Next, the water-based treatment agent for coating formation will be described.

The water-based treatment agent for coating formation preferably includes latex of rubber composing the rubber component of the coating. Since the rubber component of the coating includes at least one rubber selected from the group consisting of carboxyl-modified nitrile rubber (X-NBR) and carboxyl-modified hydrogenated nitrile rubber (X-HNBR), the water-based treatment agent for coating formation includes latex of at least one rubber selected from the group consisting of carboxyl-modified nitrile rubber (X-NBR) and carboxyl-modified hydrogenated nitrile rubber (X-HNBR). The water-based treatment agent for coating formation may also include another rubber latex, depending on the rubber component of the coating.

The water-based treatment agent for coating formation further includes an isocyanate compound, bismaleimide compound, carbon black, and a rubber-modified epoxy resin. These components included in the water-based treatment agent for coating formation is the same as those described above, and thus will not be repeatedly described. These components included in the water-based treatment agent for coating formation are preferably used in the form of aqueous dispersions in order to allow the components to be uniformly present in the water-based treatment agent.

The water-based treatment agent for coating formation is preferably free of a resorcinol-formaldehyde condensate.

The water-based treatment agent for coating formation may further include a component other than the above components. For example, the water-based treatment agent for coating formation may further include a resin, plasticizer, anti-aging agent, stabilizer, or filler as the other component.

[Rubber Product]

A rubber product of the present embodiment is a rubber product reinforced by the rubber-reinforcing cord of the present embodiment. The type of the rubber product is not particularly limited. Examples of the rubber product of the present embodiment include tires of automobiles and bicycles and transmission belts. Examples of the transmission belts include synchronous transmission belts and friction transmission belts. Examples of the synchronous transmission belts include toothed belts typified by timing belts for automobiles. Examples of the friction transmission belts include flat belts, round belts, V belts, and V-ribbed belts. That is, the rubber product of the present embodiment may be a toothed belt, flat belt, round belt, V belt, or V-ribbed belt.

The rubber product of the present embodiment is formed by embedding the rubber-reinforcing cord of the present embodiment in a rubber composition (matrix rubber). The technique for embedding the rubber-reinforcing cord in the matrix rubber is not particularly limited, and a commonly-known technique may be employed. The rubber-reinforcing cord of the present embodiment is embedded in the rubber product (e.g., a rubber belt) of the present embodiment. The rubber product of the present embodiment thus formed has high bending fatigue resistance. Therefore, the rubber product of the present embodiment is particularly suitable for use in, for example, a timing belt of a vehicle engine and a belt for driving an accessory of a vehicle.

The type of the rubber included in the rubber composition in which the rubber-reinforcing cord of the present embodiment is embedded is not particularly limited. The rubber is desirably hydrogenated nitrile rubber. The reason of this is that, as described above, the coating of the rubber-reinforcing cord of the present embodiment can maintain the flexibility to achieve the bending fatigue resistance and can be improved in adhesion when used in combination with matrix rubber including hydrogenated nitrile rubber. Additionally, the hydrogenated nitrile rubber may be one in which a zinc acrylate derivative (such as zinc methacrylate) is dispersed. At least one rubber selected from hydrogenated nitrile rubber as such and hydrogenated nitrile rubber in which a zinc acrylate derivative is dispersed is preferable in view of water resistance and oil resistance. The matrix rubber may further include carboxyl-modified hydrogenated nitrile rubber.

Figure 1:
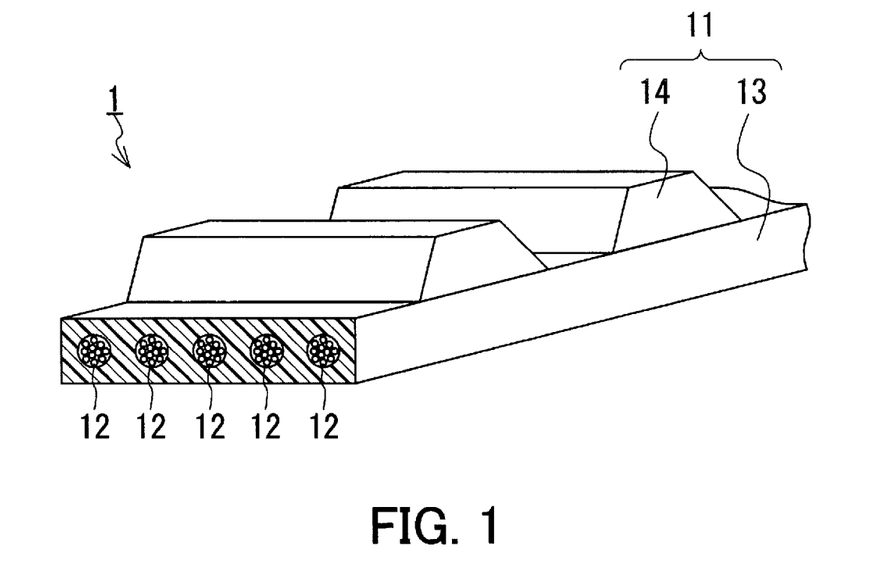
FIG. 1 is a partial exploded perspective view schematically showing an example of a rubber product according to the present invention.

FIG. 1 shows a toothed belt as one example of the rubber product. The toothed belt 1 shown in FIG. 1 includes a belt body 11 and a plurality of rubber-reinforcing cords 12. The belt body 11 includes a belt portion 13 and a plurality of tooth portions 14 arranged at regular intervals and protruding from the belt portion 13. The rubber-reinforcing cords 12 are embedded within the belt portion 13 so as to extend parallel to the length direction of the belt portion 13. Each rubber-reinforcing cord 12 is the rubber-reinforcing cord of the present embodiment.

EXAMPLES

Hereinafter, the embodiment of the present invention will be described in more detail with Examples and Comparative Examples.

[Production of Rubber-Reinforcing Cord]

Examples 1 to 6

Figure 2:
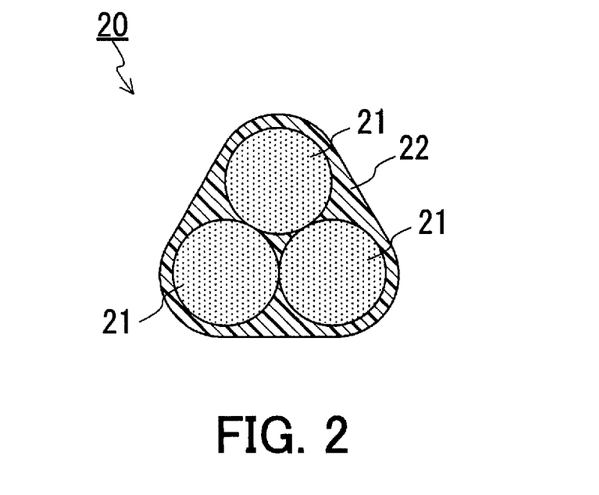
FIG. 2 is a cross-sectional view showing a strand in EXAMPLES.
Figure 3:
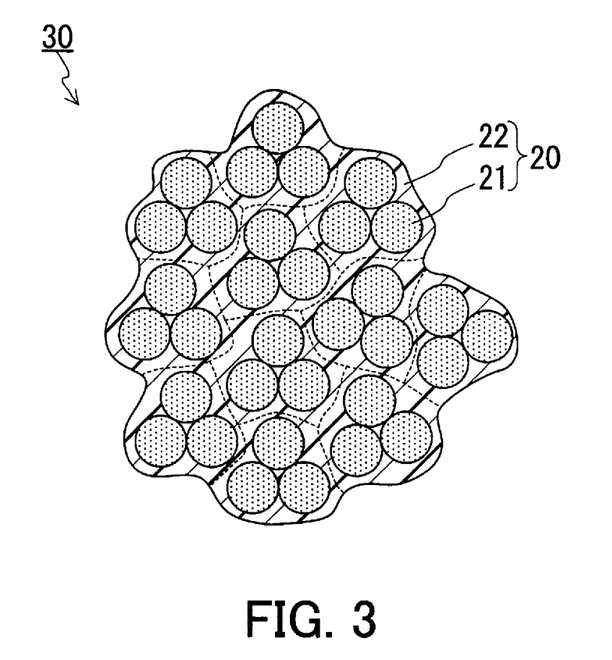
FIG. 3 is a cross-sectional view showing a rubber-reinforcing cord in EXAMPLES.

A glass fiber (filament bundle) constituted by a bundle of 200 glass filaments (composed of E-glass and having an average diameter of 9 μm) was prepared. Three such glass fibers were aligned, and a water-based adhesive whose solids composition has a mass ratio (solid mass ratio) as shown in Table 1 below was applied to the three glass fibers and dried in a drying oven set at 150° C. for 1 minute. A strand was formed in this manner. The strand formed has a cross-section as shown in FIG. 2. That is, a strand 20 was formed by providing a coating 22 to cover the surfaces of three glass fibers 21 each composed of a large number of glass filaments. The three glass fibers 21 were adhered to each other by the coating 22. The strand obtained as above was primarily twisted at two turns/25 mm. Next, 11 such twisted strands were aligned and finally twisted at two turns/25 mm. A rubber-reinforcing cord 30 having a cross-section as shown in FIG. 3 was obtained in this manner. The proportion of the coating in the resultant cord was 20 mass %. Reinforcing cords of Examples 1 to 6 were obtained in this manner.

Comparative Examples 1 to 23

Reinforcing cords of Comparative Examples 1 to 23 were obtained in the same manner as in Examples 1 to 6, except that water-based treatment agents whose solids compositions have mass ratios (solid mass ratios) as shown in Tables 2-1 to 2-4 below were used to form coatings.

TABLE 1

| Components | Solid mass ratio (parts by mass) | | | | | |
|---|---|---|---|---|---|---|
| | Example 1 | Example 2 | Example 3 | Example 4 | Example 5 | Example 6 |
| X-NBR latex (solids content: 40 mass %) (*1) | 100 | — | 100 | 100 | 100 | 100 |
| X-HNBR latex (solids content: 40 mass %) (*2) | — | 100 | — | — | — | — |
| Aqueous bismaleimide dispersion (solids content: 50 mass %) | 15 | 15 | 15 | 15 | 15 | 15 |
| Blocked isocyanate (solids content: 40 mass %) | 30 | 30 | 30 | 30 | 30 | 30 |
| Carbon black (solids content: 30 mass %) | 10 | 10 | 10 | 10 | 10 | 10 |
| NBR-modified epoxy resin (solids content: 50 mass %) (*3) | 15 | 15 | 5 | 10 | 20 | 30 |

(*1) Synthomer 6617 Latex (manufactured by Synthomer plc)
(*2) Zetpol Latex (manufactured by Zeon Corporation)
(*3) EPR-1415-1 (manufactured by ADEKA Corporation)

TABLE 2-1

| Components | Solid mass ratio (parts by mass) | | | | | | |
|---|---|---|---|---|---|---|---|
| | Comparative Example 1 | Comparative Example 2 | Comparative Example 3 | Comparative Example 4 | Comparative Example 5 | Comparative Example 6 | Comparative Example 7 |
| X-NBR latex (solids content: 40 mass %) (*1) | 100 | 100 | 100 | | 100 | 100 | 100 |
| NBR latex (solids content: 40 mass %) (*4) | — | — | — | 100 | — | — | — |

TABLE 2-1-continued

| Components | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Aqueous bismaleimide dispersion (solids content: 50 mass %) | 15 | 15 | 15 | 15 | — | 15 | 15 |
| Blocked isocyanate (solids content: 40 mass %) | 30 | 30 | 30 | 30 | 30 | — | 30 |
| Carbon black (solids content: 30 mass %) | 10 | 10 | 10 | 10 | 10 | 10 | — |
| NBR-modified epoxy resin (solids content: 50 mass %) (*3) | — | 3 | 32 | 15 | 15 | 15 | 15 |

(*1) Synthomer 6617 Latex (manufactured by Synthomer plc)
(*3) EPR-1415-1 (manufactured by ADEKA Corporation)
(*4) Nipol 1562 Latex (manufactured by Zeon Corporation)

TABLE 2-2

| Components | Comparative Example 8 | Comparative Example 9 | Comparative Example 10 | Comparative Example 11 |
|---|---|---|---|---|
| X-NBR latex (solids content: 40 mass %) (*1) | 100 | 100 | 100 | 100 |
| Aqueous bismaleimide dispersion (solids content: 50 mass %) | 15 | 15 | 3 | 30 |
| Blocked isocyanate (solids content: 40 mass %) | 30 | 30 | 5 | 60 |
| Carbon black (solids content: 30 mass %) | 10 | 10 | 1 | 20 |
| NBR-modified epoxy resin (solids content: 50 mass %) (*3) | — | — | 15 | 30 |
| Bisphenol A epoxy resin (solids content: 60 mass %) | 15 | — | — | — |
| Glycerol polyglycidyl ether (solids content: 99 mass %) | — | 15 | — | — |

(*1) Synthomer 6617 Latex (manufactured by Synthomer plc)
(*3) EPR-1415-1 (manufactured by ADEKA Corporation)

TABLE 2-3

| Components | Comparative Example 12 | Comparative Example 13 | Comparative Example 14 | Comparative Example 15 | Comparative Example 16 | Comparative Example 17 |
|---|---|---|---|---|---|---|
| Resorcinol-formaldehyde condensate (*5) | 10 | 10 | 10 | 10 | 10 | 10 |
| VP latex (solids content: 40 mass %) (*6) | 70 | 70 | 70 | 50 | 30 | — |
| CSM latex (solids content: 40 mass %) (*7) | 30 | — | — | — | — | — |
| SBR latex (solids content: 50 mass %) (*8) | — | 30 | — | — | — | — |

TABLE 2-3-continued

| Components | Solid mass ratio (parts by mass) | | | | | |
|---|---|---|---|---|---|---|
| | Comparative Example 12 | Comparative Example 13 | Comparative Example 14 | Comparative Example 15 | Comparative Example 16 | Comparative Example 17 |
| X-NBR latex (solids content: 40 mass %) (*1) | — | — | 30 | 50 | 70 | 100 |
| NBR-modified epoxy resin (solids content: 50 mass %) (*3) | — | — | — | — | — | — |

(*1) Synthomer 6617 Latex (manufactured by Synthomer plc)
(*3) EPR-1415I (manufactured by ADEKA Corporation)
(*5) SUMIKANOL (manufactured by Sumitomo Chemical Co., Ltd.)
(*6) PYRATEX (manufactured by NIPPON A&L INC.)
(*7) SEPOLEX CSM Latex (manufactured by Sumitomo Seika Chemicals Co., Ltd.)
(*8) SB Latex (manufactured by Asahi Kasei Chemicals Corporation)

TABLE 2-4

| Components | Solid mass ratio (parts by mass) | | | | | |
|---|---|---|---|---|---|---|
| | Comparative Example 18 | Comparative Example 19 | Comparative Example 20 | Comparative Example 21 | Comparative Example 22 | Comparative Example 23 |
| Resorcinol-formaldehyde condensate (*5) | 10 | 10 | 10 | 10 | 10 | 10 |
| VP latex (solids content: 40 mass %) (*6) | 70 | 70 | 70 | 50 | 30 | — |
| CSM latex (solids content: 40 mass %) (*7) | 30 | — | — | — | — | — |
| SBR latex (solids content: 50 mass %) (*8) | — | 30 | — | — | — | — |
| X-NBR latex (solids content: 40 mass %) (*1) | — | — | 30 | 50 | 70 | 100 |
| NBR-modified epoxy resin (solids content: 50 mass %) (*3) | 15 | 15 | 15 | 15 | 15 | 15 |

(*1) Synthomer 6617 Latex (manufactured by Synthomer plc)
(*3) EPR-1415-1 (manufactured by ADEKA Corporation)
(*5) SUMIKANOL (manufactured by Sumitomo Chemical Co., Ltd.)
(*6) PYRATEX (manufactured by NIPPON A&L INC.)
(*7) SEPOLEX CSM Latex (manufactured by Sumitomo Seika Chemicals Co., Ltd.)
(*8) SB Latex (manufactured by Asahi Kasei Chemicals Corporation)

[Evaluation of Adhesion (Adhesion Strength to Matrix Rubber and Type of Failure)]

First, two pieces of rubber composed as shown in Table 3 (each piece having a width of 25 mm, a length of 50 mm, and a thickness of 5 mm) were prepared. Next, the rubber-reinforcing cord of each of Examples and Comparative Examples was sandwiched by the two rubber pieces in such a manner as to extend parallel to the length of the rubber pieces, and the cord and rubber pieces were adhered together by heating them at 150° C. for 20 minutes. The specimen thus prepared was pulled lengthwise by a tensile tester to measure the peel strength between the matrix rubber and rubber-reinforcing cord of each of Examples and Comparative Examples. It was also examined whether the failure of the specimen was "rubber failure" which occurred while the rubber-reinforcing cord and matrix rubber remained adhered, "interfacial peeling" which occurred at the interface between the matrix rubber and rubber-reinforcing cord, or "spot" which is intermediate between "rubber failure" and "interfacial peeling." Specifically, the term "rubber failure" refers to a type of failure in which a crack appears within the matrix rubber without peeling at the interface between the matrix rubber and rubber-reinforcing cord and in which 90% or more of the surface of the rubber-reinforcing cord is covered by the matrix rubber at the peeling interface. The term "spot" refers to a state where 20% or more and less than 90% of the surface of the rubber-reinforcing cord is covered by the matrix rubber at the peeling interface. The term "interfacial peeling" refers to a type of failure in which peeling occurs between the matrix rubber and rubber-reinforcing cord without rubber failure and in which the percentage of broken rubber present at the surface of the peeled rubber-reinforcing cord is less than 20%. The percentage of rubber present at the peeling interface was determined using a printed image of a photograph of the peeling interface. Specifically, first, a photograph of the specimen is taken so as to include the whole peeling interface, a portion corresponding to the whole specimen is cut out from a printed image of the photograph, and the weight W of the cut-out printed image of the whole specimen is measured. Next, a portion corresponding to the rubber is cut out from the printed image of the whole specimen, and the weight w of the whole cut-out portion corresponding to the rubber is measured. Using the measured values of the weights W and w, the percentage of the remaining rubber is determined ((w/W)×100%). The results are shown in Tables 4 and 5-1 to 5-3.

[Evaluation of Bending Fatigue Resistance]

A test for evaluation of the bending fatigue resistance was carried out only for the rubber-reinforcing cords of Examples and Comparative Examples whose adhesion evaluation test results are "rubber failure" or "spot." This test was not carried out for the rubber-reinforcing cords whose adhesion evaluation test results are "interfacial peeling" because the adhesion of such rubber-reinforcing cords is insufficient. The rubber-reinforcing cords were each embedded in a matrix rubber having the composition shown in Table 3 to form a flat belt having a width of 10 mm, a height of 300 mm, and a thickness of 3 mm. The obtained flat belts were subjected to a bending test in which the flat belts were bent 50,000 times and 100,000 times. The bending test was carried out using a bending tester 40 shown in FIG. 4. Each specimen was measured for the tensile strength before and after the bending test. The term "tensile strength" as used herein refers to the breaking strength obtained by carrying out a tensile test using a commonly used tensile tester and commonly used cordgrip. The unit is N/cord. To measure the tensile strength, "Autograph AGS-5kNX" manufactured by Shimadzu Corporation was used as a measuring apparatus, and "Trapezium" was used as software. The measurement speed was set to 250 mm/min, the distance between grips was set to 250 mm, and the initial load was set to 10 N.

Figure 4:
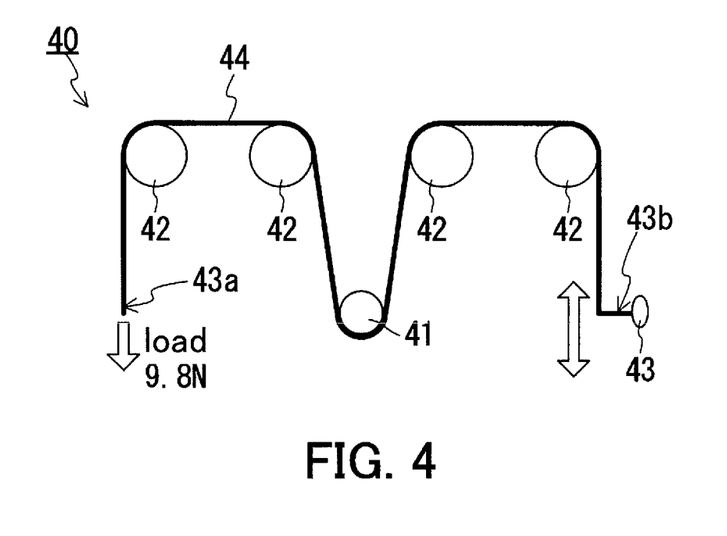
FIG. 4 is a diagram schematically showing the method of a bending test carried out for rubber-reinforcing cords of Examples and Comparative Examples.

The bending tester 40 of FIG. 4 has one flat pulley 41 (diameter: 10 mm), four guide pulleys 42, and a motor 43. First, a produced specimen 44 (flat belt) was hung on the five pulleys. Then, a weight was attached to one end 43a of the specimen 44 to add a 9.8 N load to the specimen 44. In this state, the other end 43b of the specimen 44 was reciprocated by the motor 43 to repeatedly bend the specimen 44 around the flat pulley 41. The bending test was carried out at room temperature. After the bending test was carried out for the specimen 44 in this manner, the tensile strength of the specimen having undergone the bending test was measured.

Subsequently, on the basis that the tensile strength rate of the specimen yet to undergo the bending test is defined as 100%, the tensile strength rate of the specimen having undergone the bending test, namely the strength retention rate (%), was determined. The greater the tensile strength retention rate is, the better the bending fatigue resistance is. The results are shown in Tables 4 and 5-1 to 5-3, in which the strength retention rate obtained after the 50,000-cycle bending test is "strength retention rate 1" and the strength retention rate obtained after the 100,000-cycle bending test is "strength retention rate 2." The rubber-reinforcing cords having a strength retention rate 1 of 95% or more and a strength retention rate 2 of 85% or more are rated as rubber-reinforcing cords having desirable bending fatigue resistance.

TABLE 3

| Components | Mass ratio |
| --- | --- |
| Hydrogenated nitrile rubber (*1) | 70 |
| Zinc dimethacrylate-containing hydrogenated nitrile rubber (*2) | 30 |
| Zinc oxide | 10 |
| Stearic acid | 1 |
| Carbon black | 30 |
| Trioctyl trimellitate | 5 |
| Sulfur | 0.1 |
| 1,3-bis(t-butylperoxy-isopropyl)benzene | 6 |
| Magnesium oxide | 1 |
| 4,4'-(α,α-dimethylbenzyl)diphenylamine | 0.5 |
| 2-mercaptobenzimidazole zinc salt | 0.5 |
| Triallyl isocyanurate | 1 |

(*1) Zetpol 2020 (manufactured by Zeon Corporation)
(*2) Zetpol 2000 L (manufactured by Zeon Corporation)

TABLE 4

| | Example | | | | | |
| --- | --- | --- | --- | --- | --- | --- |
| | 1 | 2 | 3 | 4 | 5 | 6 |
| Peeling strength (N/25 mm) | 313.9 | 279.8 | 276.5 | 285.9 | 292.2 | 293.7 |
| Peeling interface | Rubber failure | Rubber failure | Rubber failure | Rubber failure | Rubber failure | Rubber failure |
| Strength retention rate 1 (%) | 98 | 97 | 98 | 98 | 96 | 95 |
| Strength retention rate 2 (%) | 90 | 90 | 92 | 90 | 88 | 85 |

TABLE 5-1

| | Comparative Example | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| Peeling strength (N/25 mm) | 150.3 | 203.1 | 254 | 104.0 | 115.5 | 110.7 | 116.1 | 113.7 | 126.7 | 101.8 |
| Peeling interface | Interfacial peeling | Spot | Spot | Interfacial peeling | Interfacial peeling | Interfacial peeling | Interfacial peeling | Interfacial peeling | Interfacial peeling | Interfacial peeling |

TABLE 5-1-continued

|  | Comparative Example | | | | | | | | | |
|---|---|---|---|---|---|---|---|---|---|---|
|  | 1 | 2 | 3 | 4 | 5 | 6 | 7 | 8 | 9 | 10 |
| Strength retention rate 1 (%) | — | 95 | 91 | — | — | — | — | — | — | — |
| Strength retention rate 2 (%) | — | 85 | 79 | — | — | — | — | — | — | — |

TABLE 5-2

|  | Comparative Example | | | | | | | | | |
|---|---|---|---|---|---|---|---|---|---|---|
|  | 11 | 12 | 13 | 14 | 15 | 16 | 17 | 18 | 19 | 20 |
| Peeling strength (N/25 mm) | 195.5 | 95.4 | 99.7 | 94.6 | 102.5 | 101.3 | 97.6 | 91.4 | 93.8 | 91.2 |
| Peeling interface | Spot | Interfacial peeling | Interfacial peeling | Interfacial peeling | Interfacial peeling | Interfacial peeling | Interfacial peeling | Interfacial peeling | Interfacial peeling | Interfacial peeling |
| Strength retention rate 1 (%) | 88 | — | — | — | — | — | — | — | — | — |
| Strength retention rate 2 (%) | 73 | — | — | — | — | — | — | — | — | — |

TABLE 5-3

| Comparative Example | 21 | 22 | 23 |
|---|---|---|---|
| Peeling strength (N/25 mm) | 92.3 | 101.9 | 94.7 |
| Peeling interface | Interfacial peeling | Interfacial peeling | Interfacial peeling |
| Strength retention rate 1 (%) | — | — | — |
| Strength retention rate 2 (%) | — | — | — |

The rubber-reinforcing cords of Examples 1 to 6 exhibited stronger adhesion to matrix rubber than the rubber-reinforcing cords of Comparative Examples 1 to 23 and high bending fatigue resistance. On the other hand, the rubber-reinforcing cords of Comparative Examples 1 to 23 exhibited lower peeling strength than the rubber-reinforcing cords of Examples. Additionally, the peeling interface was interfacial peeling or spot, which demonstrates inferior adhesion. The coatings of the rubber-reinforcing cords of Comparative Examples 2 and 3 included an NBR-modified epoxy resin, and the rubber-reinforcing cords of Comparative Examples 2 and 3 achieved relatively high adhesion compared to the rubber-reinforcing cords of other Comparative Examples. However, since the contents of the NBR-modified epoxy resin were beyond the range specified for the rubber-reinforcing cord of the present invention, the peeling interface was spot and the peeling strength was greatly inferior to that of Examples.

The invention claimed is:

1. A rubber-reinforcing cord for reinforcing a rubber product, the rubber-reinforcing cord comprising: at least one strand, wherein
the at least one strand comprises at least one filament bundle and a coating provided to cover at least a portion of a surface of the at least one filament bundle,
the coating comprises a rubber component comprising at least one selected from the group consisting of carboxyl-modified nitrile rubber and carboxyl-modified hydrogenated nitrile rubber, an isocyanate compound, a bismaleimide compound, carbon black, and a rubber-modified epoxy resin, and
in the coating, the content of the isocyanate compound is 10 to 50 parts by mass, the content of the bismaleimide compound is 5 to 25 parts by mass, the content of the carbon black is 2 to 18 parts by mass, and the content of the rubber-modified epoxy resin is 5 to 30 parts by mass, with respect to 100 parts by mass of the rubber component.

2. The rubber-reinforcing cord according to claim 1, wherein the rubber-modified epoxy resin is a nitrile rubber-modified epoxy resin.

3. The rubber-reinforcing cord according to claim 1, comprising no other coating than the coating.

4. The rubber-reinforcing cord according to claim 1, wherein the total content of the isocyanate compound, the bismaleimide compound, the carbon black, and the rubber-modified epoxy resin is 100 parts by mass or less with respect to 100 parts by mass of the rubber component.

5. The rubber-reinforcing cord according to claim 1, wherein the coating is free of a resorcinol-formaldehyde condensate.

6. A rubber product reinforced by the rubber-reinforcing cord according to claim 1.

7. The rubber product according to claim 6, being a rubber belt comprising matrix rubber and the rubber-reinforcing cord embedded in the matrix rubber.

8. The rubber product according to claim 7, wherein the matrix rubber comprises hydrogenated nitrile rubber.

* * * * *